United States Patent
Tan et al.

(10) Patent No.: US 11,086,362 B2
(45) Date of Patent: *Aug. 10, 2021

(54) METHOD, APPARATUS AND COMPUTER PROGRAM PRODUCT

(71) Applicant: Lenovo (Beijing) Limited, Beijing (CN)

(72) Inventors: Yan Li Tan, Beijing (CN); Jiu Ru Tang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,333

(22) Filed: Mar. 24, 2017

(65) Prior Publication Data

US 2017/0285687 A1 Oct. 5, 2017

(30) Foreign Application Priority Data

Mar. 31, 2016 (CN) .......................... 201610201936.X (51) Int. Cl.
*G06F 1/16* (2006.01)
*G06F 3/01* (2006.01)
*G09G 3/20* (2006.01)

(52) U.S. Cl.
CPC ............ *G06F 1/1652* (2013.01); *G06F 3/015* (2013.01); *G09G 3/2092* (2013.01); *G09G 2354/00* (2013.01); *G09G 2380/02* (2013.01)

(58) Field of Classification Search
CPC ......... G02F 1/1368; G02F 1/167; G06F 3/041
See application file for complete search history.

(56) References Cited

U.S. PATENT DOCUMENTS

| | | | | |
|---|---|---|---|---|
| 8,866,788 B1* | 10/2014 | Birnbaum | ............... | G06F 3/016 |
| | | | | 340/407.2 |
| 9,405,367 B2* | 8/2016 | Jung | ....................... | G06F 3/016 |
| 9,696,840 B2* | 7/2017 | Xu | ......................... | G06F 3/0414 |
| 9,864,438 B2* | 1/2018 | Seo | ........................ | G06F 3/03 |
| 10,089,780 B2* | 10/2018 | Lamy | ..................... | G06F 3/016 |
| 10,114,476 B2* | 10/2018 | Seo | ........................ | G06F 3/0487 |
| 10,139,294 B2* | 11/2018 | Vosgueritchian | ........ | G01L 1/225 |
| 10,152,153 B2* | 12/2018 | Jung | ..................... | G06F 1/1652 |
| 10,254,927 B2* | 4/2019 | Missig | ................ | G06F 3/04817 |
| 10,423,249 B2* | 9/2019 | Xu | ........................ | G06F 3/0487 |

(Continued)

FOREIGN PATENT DOCUMENTS

| | | |
|---|---|---|
| CN | 103576979 A | 2/2014 |
| CN | 104123035 A | 10/2014 |
| CN | 104375737 A | 2/2015 |

*Primary Examiner* — Olga V Merkoulova (74) *Attorney, Agent, or Firm* — Kunzler Bean & Adamson (57) ABSTRACT

A method, an apparatus and a computer program product are disclosed. The method includes determining a current working state and configuration of a device, detecting information, controlling the device to a second working state, and configuring the device. The apparatus includes a housing and a processor that determines a current working state and configuration, detects information, controls the apparatus to a second working state, and configures the apparatus. The computer program product includes code to perform determination of a current working state and configuration, detection of information, control of the device to adjust to a second working state, and configuration of the device.

20 Claims, 4 Drawing Sheets

(56) References Cited

U.S. PATENT DOCUMENTS

| | | | |
|---|---|---|---|
| 10,518,170 B2 * | 12/2019 | Levesque | G06F 3/04883 |
| 10,558,289 B2 * | 2/2020 | Wang | G06F 3/0445 |
| 10,635,288 B2 * | 4/2020 | Bandishti | G06F 1/1652 |
| 10,788,953 B2 * | 9/2020 | Chaudhri | G06F 3/04886 |
| 10,867,535 B2 * | 12/2020 | Bandishti | G06F 1/1652 |
| 10,884,579 B2 * | 1/2021 | Van Os | G06F 3/04817 |
| 2004/0008191 A1 * | 1/2004 | Poupyrev | G06F 3/011 345/184 |
| 2009/0135116 A1 * | 5/2009 | Chang | G09G 3/3696 345/87 |
| 2010/0141605 A1 * | 6/2010 | Kang | G06F 3/0412 345/174 |
| 2012/0268412 A1 * | 10/2012 | Cruz-Hernandez | G06F 3/0488 345/174 |
| 2013/0194207 A1 * | 8/2013 | Andrew | G06F 1/1626 345/173 |
| 2013/0321260 A1 | 12/2013 | Joo | |
| 2014/0004906 A1 | 1/2014 | Chi et al. | |
| 2015/0082145 A1 | 3/2015 | Ames et al. | |
| 2016/0109973 A1 * | 4/2016 | Kim | G06F 3/041 345/173 |

\* cited by examiner

METHOD, APPARATUS AND COMPUTER PROGRAM PRODUCT

FIELD

The subject matter disclosed herein relates to the field of electronic technologies, and in particular, to an information processing method and a deformable electronic device.

BACKGROUND

With the development of display technologies, flexible screens are increasingly applied to various electronic devices. A user may adjust a flexible-screen electronic device into various forms as required. However, since a configuration of the flexible-screen electronic device must be adjusted manually, a technical problem exists in a deformable electronic device in that the options for change in the device's configuration are limited.

SUMMARY

A method, an apparatus and a computer program product are disclosed.

The method comprises determining a current working state of a deformable electronic device to be a first working state; determining a current configuration of the deformable electronic device to be a first configuration corresponding to the first working state; detecting information; controlling the deformable electronic device to be adjusted from the first working state to a second working state as a result of determining that the information satisfies a preset condition; and configuring the deformable electronic device.

The apparatus comprises a housing; and a processor coupled to the housing; wherein the processor determines a current working state of the apparatus to be a first working state; determines a current configuration of the apparatus to be a first configuration corresponding to the first working state; detects information; controls the apparatus to be adjusted from the first working state to a second working state as a result of determining that the information satisfies a preset condition; and configures the apparatus.

The computer program product comprises a computer readable storage medium that stores code executable by a processor, the executable code comprising code to perform: determination of a current working state of a deformable electronic device to be a first working state; determination of a current configuration of the deformable electronic device to be a first configuration corresponding to the first working state; detection of information; control of the deformable electronic device to adjust from the first working state to a second working state as a result of determining that the information satisfies a preset condition; and configuration of the deformable electronic device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

The embodiments provide an information processing method and an electronic device for solving the technical problem that exists in a deformable electronic device in that the options for change in the device's configuration are limited. To solve the above-described technical problem, the technical solutions in the embodiments of the present application have the following general ideas.

In one embodiment, the method comprises a determination of a current working state of the electronic device as a first working state, and a current configuration of the electronic device as a first configuration corresponding to the first working state. The method may also comprise detection of information, and control of the electronic device to be adjusted from the first working state to a second working state different from the first working state when the information satisfies a preset condition and the electronic device is deformed from the first configuration to a second configuration corresponding to the second working state, wherein the second configuration is different from the first configuration.

In other words, on the basis of the current working state of the deformable electronic device, the current configuration of the deformable electronic device can be adjusted to a configuration corresponding to the current working state, so as to solve the technical problem where the options for configuration of the electronic device are limited.

To better understand the above-described technical solutions, the technical solutions of the embodiments are described in detail with reference to the accompanying drawings and specific embodiments. It should be understood that the embodiments of the present application and the specific features in the embodiment are detailed descriptions of the technical solutions, rather than limitations of the technical solutions, and the embodiments of the present application and the technical features in the embodiments may be combined together without conflict.

In one embodiment, the electronic device comprises a deformable device comprising a flexible screen, such as a smart phone, notebook computer, tablet computer, wearable device, or other deformable electronic device.

Figure 1:
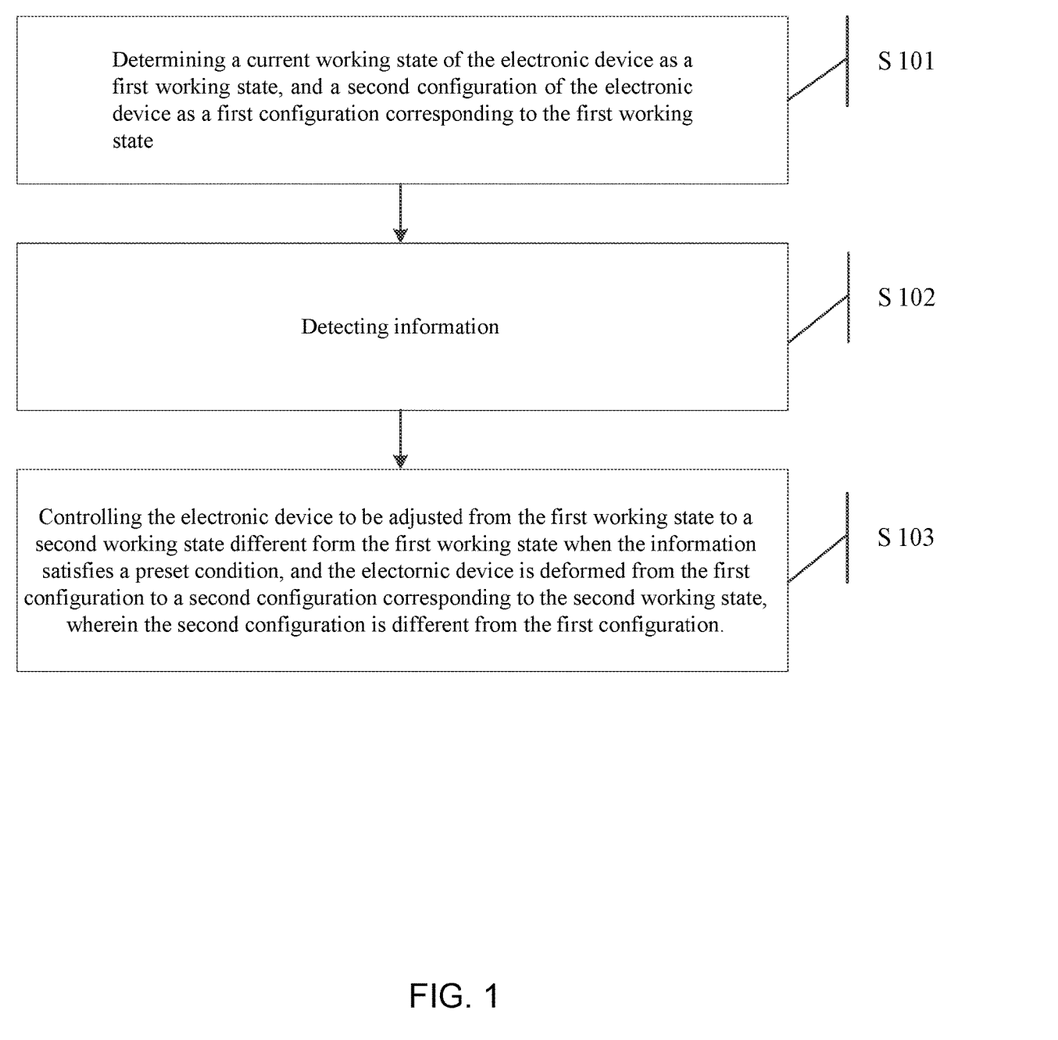
FIG. 1 is a method flow diagram of one embodiment of an information processing method.

FIG. 1 depicts a method flow diagram for an information processing method. Generally speaking, steps S101, S102, and S103 involve the following:

S101 involves determining a current working state of a deformable electronic device as a first working state, and a current configuration of the electronic device as a first configuration corresponding to the first working state.

S102 involves detecting information.

S103 involves controlling the electronic device to be adjusted from the first working state to a second working state different from the first working state when the information satisfies a preset condition, and the electronic device is deformed from the first configuration to a second configuration corresponding to the second working state, wherein the second configuration is different from the first configuration.

In one embodiment, the specific implementation process of Step S101 to Step S103 is as follows.

First, a current working state of the electronic device is determined and designated as a first working state. In one embodiment, this could be a screen-locked state. Then, a first configuration is determined based on the current configuration of the electronic device. This first configuration corresponds to the first working state.

Consider the following illustrative example. When a user carries the electronic device when in the screen-locked state, it may be crumpled up, folded or otherwise configured so that it can be placed comfortably into a user's pocket. At this time, the current configuration of the electronic device is a crumpled-up configuration corresponding to the screen-locked state.

Once the first working state and first configuration have been determined, information is detected. During a specific implementation, the information may be a piece of verification information, information input by the user, or some other information. After the information satisfies a preset condition, the electronic device is adjusted from the first working state to a second, different, working state.

For example, if the user inputs verification information that is capable of releasing the screen-locked state that the electronic device is currently in, the electronic device is adjusted from the screen-locked state to the screen-unlocked state. Meanwhile, the electronic device is deformed from the first configuration to the second configuration corresponding to the second working state.

To continue the illustrative example, if the first configuration of the electronic device in the screen-locked state is a crumpled-up configuration, and the electronic device is adjusted from the screen-locked state to the screen-unlocked state, the current configuration of the electronic device will be changed from the first, crumpled-up configuration to a second, straight panel configuration which is convenient for the user to use, thereby greatly improving the user experience.

This method further comprises controlling the electronic device to be adjusted from the first configuration to the second configuration corresponding to the second working state. In other words, the electronic device is capable of actively deforming to the second configuration as a result of a change of the current working state of the electronic device.

Alternatively, the method may comprise receiving an external force applied to the electronic device, wherein the electronic device is deformed from the first configuration to the second configuration under the effect of the external force. In such a case, the electronic device adjusts its current configuration to the second configuration corresponding to the current working state on the basis of the change in the current working state of the electronic device.

To continue using the above unlocked screen as an example, when the current working state of the electronic device is adjusted from the screen-locked state to the screen-unlocked state, the electronic device is capable of adjusting the current configuration from the crumpled-up configuration to the straight panel configuration on the basis of the current screen-unlocked state, so that the user may perform operations on the device in a more comfortable and convenient way than would be possible in the crumpled-up configuration.

Figure 2:
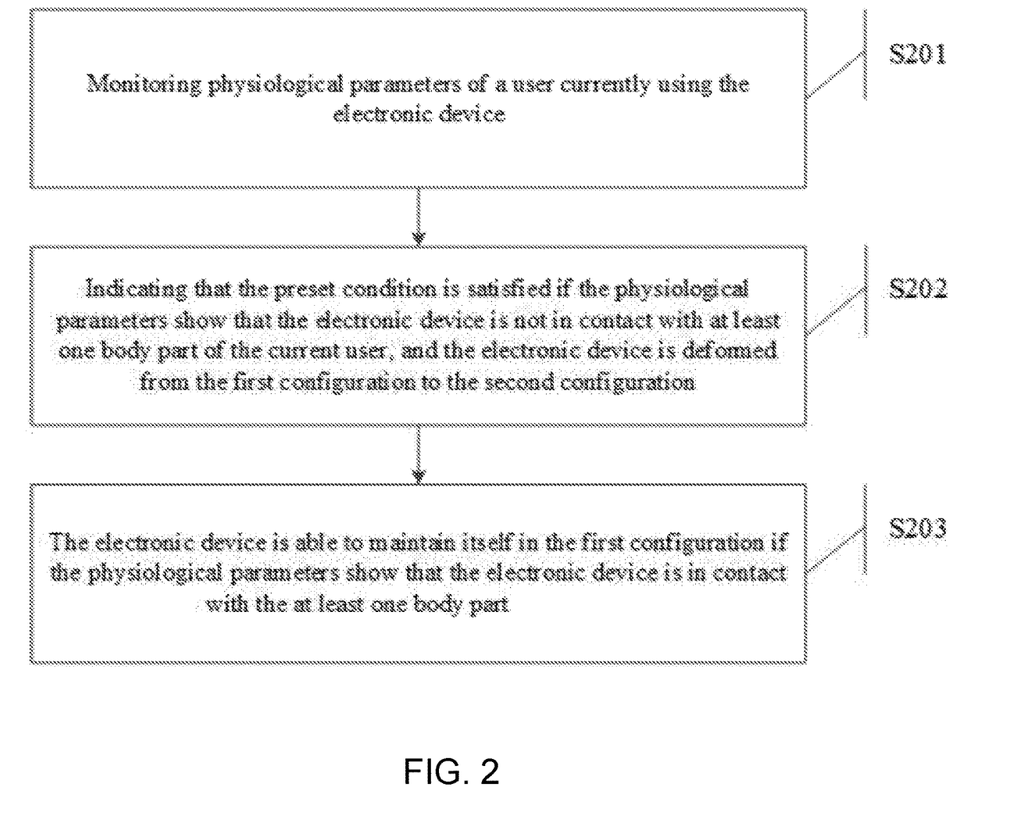
FIG. 2 is a flow diagram of steps further included in the method when the information is specifically physiological parameter information in one embodiment of the information processing method.

In some embodiments, the information detected in Step S102 may have a variety of forms, and is not limited to the several forms mentioned below. When, however, the information comprises physiological parameter information, referring to FIG. 2, the method may further comprise the following:

S201 involves monitoring physiological parameters of a user currently using the electronic device.

S202 involves indicating that the preset condition is satisfied if the physiological parameters show that the electronic device is not in contact with at least one body part of the current user, after which the electronic device is deformed from the first configuration to the second configuration.

S203 involves the electronic device maintaining itself in the first configuration if the physiological parameters show that the electronic device is in contact with at least one body part of the current user.

One specific implementation process of Step S201 to Step S203 is as follows.

First, the physiological parameters of a user currently using the electronic device are monitored. These physiological parameters may include respiratory system parameters and circulatory system parameters, such as heart rate information, respiratory frequency, and others. If the physiological parameters show that the electronic device is not in contact with at least one body part of the current user, the preset condition is satisfied, and the electronic device is deformed from the first configuration to the second configuration.

As an example, in some embodiments, the electronic device comprises a deformable smart phone and the user bends the smart phone to wrap around the user's wrist, the current configuration of the smart phone is a circular configuration. When the heart rate information of the user is not detected by a pressure sensor within the smart phone, it means that the smart phone has been removed from the user's wrist. In this case, the smart phone recognizes that it is not in contact with the skin surface of the user's wrist, and as a result it is determined that the smart phone satisfies the preset condition and would therefore be deformed from the circular configuration to the straight panel configuration.

Additionally, in some embodiments, the user may be alerted by the change in the current configuration of the electronic device. For instance, once the smart phone is removed from the user's wrist, the smart phone may be deformed to alert the user that the smart phone has changed to a new working state, which may indicate that the smart phone is being stolen. However, when the heart rate information of the user is obtained through the pressure sensor in the smart phone (for example, 75 beats per minute), it is indicated that the smart phone is in contact with the skin surface of the user's wrist, and will stay in the circular configuration.

In various embodiments, those skilled in the art may also obtain other physiological parameters of the user by monitoring the electronic device, so as to detect whether the electronic device satisfies the preset condition. These other physiological parameters may include respiratory frequency, skin texture and contact area with the user's body part, among others.

In some embodiments, determining whether the electronic device satisfies the preset condition may be based on the physiological parameters of the size of the contact area with the user's body part. In such cases, the size of the contact area between the electronic device and the user's body part may be detected through a relevant module for skin detection in the electronic device. If the detected contact area between the electronic device and the user's body part passes a preset threshold, such information satisfies the preset condition, and the electronic device may be deformed from the first configuration to the second configuration, thereby immediately and efficiently avoiding the loss of the electronic device. Various physiological parameters may be used to satisfy the preset condition, and other embodiments may include other physiological parameters, though they not explicitly detailed herein.

In some embodiments, the information detected in Step S102 may comprise verification information corresponding to an input operation performed by an operating body for the electronic device. Such verification information may include pattern information, fingerprint information, iris information, or other information sufficient for verification purposes.

At this time, one embodiment of the implementation process of Step S101 to Step S103 may be illustrated wherein the electronic device comprises a smart phone, the first working state comprises the screen-locked state and the first configuration comprises a rolled-up configuration. When a detected input operation is a preset unlocking operation, the electronic device will be in the unlocked state and as a result, the current configuration of the electronic device will be adjusted from the rolled-up configuration to an un-rolled configuration. In such a situation, the preset unlocking operation may include inputting a particular unlocking pattern by the user for the electronic device, and on the basis of the unlocking pattern, the electronic device can be adjusted from the screen-locked state to the screen-unlocked state. This implementation process is not limited to the specific embodiment described herein.

In some embodiments, wherein the information detected in Step S102 is a to-be-processed communication event from a second electronic device, the specific implementation process of Step S102 to Step S103 may comprise as follows.

In one embodiment, the smart phone is in a standby state and is in a rolled-up configuration, and receives a to-be-processed communication event from another electronic device. This to-be-processed communication event may be a short message, WeChat information, QQ information or other incoming information. After this to-be-processed communication is received, the smart phone determines whether the to-be-processed communication satisfies the preset condition. If the preset condition is met, the smart phone will be adjusted from the standby state to a normal working state, and the configuration of the smart phone will be deformed from the rolled-up configuration to an un-rolled configuration, so as to facilitate the viewing of information by the user or the processing of an incoming request. This both improves service performance of the smart phone and simultaneously provides a better user experience. If the preset condition is not satisfied, the smart phone will remain in the standby state and in the rolled-up configuration.

In some embodiments, the method further comprises: keeping the current working state of the electronic device as the first working state and maintaining the current configuration of the electronic device as the first configuration after verifying that the information does not satisfy the preset condition.

In some embodiments, if the information does not satisfy the preset condition, the current working state of the electronic device is kept as the first working state, and the electronic device will be actively maintained in the first configuration. Even if an external force is applied on the electronic device, as described in an earlier embodiment, the electronic device cannot be passively deformed from the first configuration to the second configuration.

Figure 5:
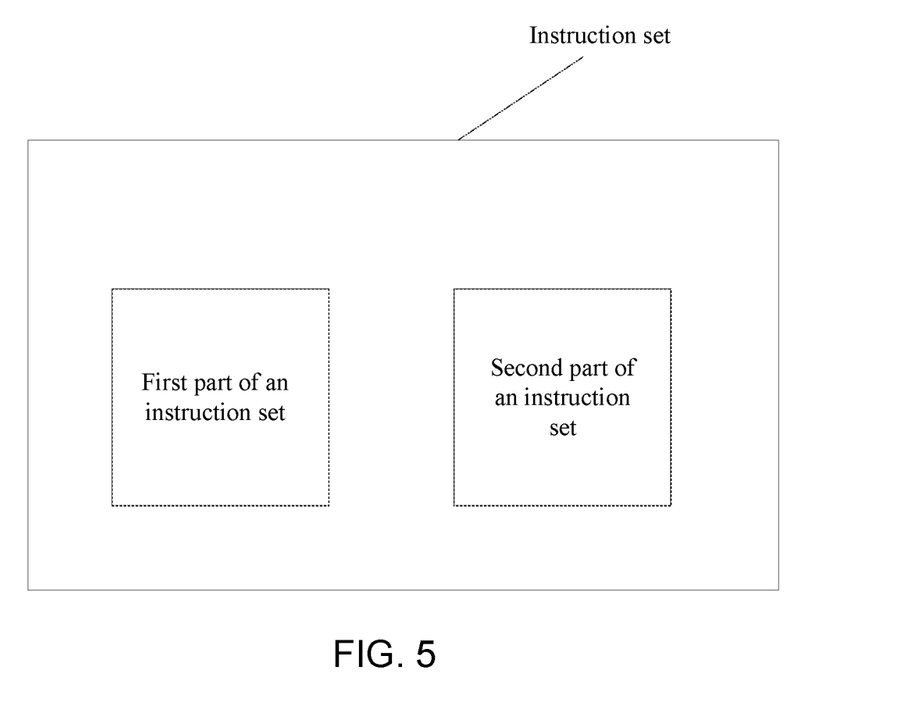
FIG. 5 is a diagram of an instruction set of one embodiment of the preset application.

In other embodiments, the method further comprises a response by the electronic device. When in the first working state, the electronic device can respond to instructions in a first part of an instruction set, and when in the second working state, can respond to instructions in a second part of the instruction set, as shown in FIG. 5. Furthermore, the number of instructions in the first part is different from the number of instructions in the second part. For example, in one embodiment, the first working state and the second working state of the electronic device may be a screen-locked state and a screen-unlocked state respectively. In another, the first working state and the second working state may be the screen-unlocked state and the screen-locked state respectively.

The method disclosed herein, in some embodiments, may additionally comprise a situation wherein the number of instructions in the first part of an instruction set corresponding to the first working state is less than the number of instructions in the second part of an instruction set corresponding to the second working state. In such a situation, the electronic device may be deformed from the first configuration to the second configuration, wherein the electronic device is deformed from a folded state to an unfolded state;

Alternatively, the number of instructions in the second part corresponding to the second working state may be less than the number of instructions in the first part corresponding to the first working state. In this case, the electronic device may be deformed from the first configuration to the second configuration, wherein the electronic device is deformed from an unfolded state to a folded state.

In one embodiment, the first working state and the second working state of the electronic device may respectively comprise a screen-locked state and a screen-unlocked state, and the electronic device is deformed from the first configuration to the second configuration, which respectively comprise a folded state and an unfolded state. That is, the electronic device is deformed from the corresponding folded configuration in the screen-locked state to the corresponding unfolded configuration in the screen-unlocked state, thereby greatly facilitating the user's convenience of use.

Alternatively, the first working state and the second working state of the electronic device may respectively comprise the screen-unlocked state and the screen-locked state, and the electronic device is deformed from the first configuration to the second configuration, which respectively comprise an unfolded state and a folded state. In other words, the electronic device may also be deformed from the corresponding unfolded configuration in the screen-unlocked state to the corresponding folded configuration in the screen-locked state.

Moreover, the various embodiments may be applied to various life scenarios for alerting the user in time. By way of one specific example, user A is to process some important files in an office and the contents of these important files are relatively confidential. After user A enters the office, a smart phone of user A is controlled to be in a deformable state and is adjusted to a right-angle configuration, and then is snapped on a door of user A's office, wherein one side of the smart phone faces a hallway and the other side faces an orientation that may be visible to user A. The side of the smart phone facing the hallway is provided with an infrared camera that may detect that there are other people approaching user A's office. In response, the side of the smart phone bending towards the user A may, through continuous flashing of the provided LED lamps or other visual or auditory signals, alert user A that the current environment is unsafe and that user A should pause review of the confidential files. Then, after user A processes these confidential files, the smart phone is removed, and the electronic device may be maintained in a certain fixed configuration.

Again, by way of another specific example, user B rides a bicycle on a relatively remote road at night. In this situation, the current configuration of the smart phone may be maintained in the folded state, so that the smart phone is snapped on a handlebar of the bicycle. One side of the smart phone faces in a substantially forward direction of travel, and the other side faces a substantially backward direction. When the smart phone detects that there are other people approaching user B, the smart phone, through safety alert information such as voice broadcasting, flashing of red LED lamps, or the like, timely alerts user B to adopt safety measures in time to avoid hazards. Of course, the user may adapt the specific configuration(s) to meet his or her own needs. Furthermore, other embodiments are contemplated, but are not enumerated herein.

Figure 3:
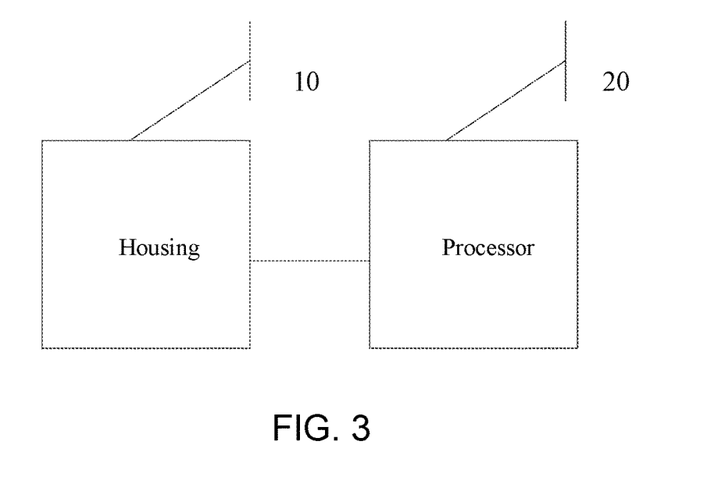
FIG. 3 is a structural block diagram of one embodiment of an electronic device of the present application.

FIG. 3 depicts one embodiment of a deformable electronic device, comprising a housing 10, a processor 20 coupled to the housing 10, wherein the processor 20 determines a current working state of the electronic device as a first working state, and a current configuration of the electronic device as a first configuration corresponding to the first working state. The processor 20 also may detect information and control the electronic device to be deformed from the first working state to a second working state different from the first working state when the information satisfies a preset condition. After the preset condition is satisfied, the electronic device is deformed from the first configuration to a second configuration corresponding to the second working state, wherein the second configuration is different from the first configuration.

In some embodiments, the processor 20 is specifically used for controlling the electronic device to be adjusted from the first configuration corresponding to the first working state to the second configuration corresponding to the second working state. It may be further used for recognizing an external force applied to the electronic device, wherein the electronic device is deformed from the first configuration to the second configuration corresponding to the second working state under the effect of the external force.

Furthermore, the processor 20 may also be used for keeping the current working state of the electronic device as the first working state and maintaining the current configuration of the electronic device as the first configuration after verifying that the information does not satisfy the preset condition.

In the embodiment of the present application, the processor 20 is further used to respond to instructions in a first part of an instruction set; and the electronic device, when in the second working state, can respond to instructions in a second part of the instruction set, wherein the number of instructions in the first part is different from the number of instructions in the second part.

Figure 4:
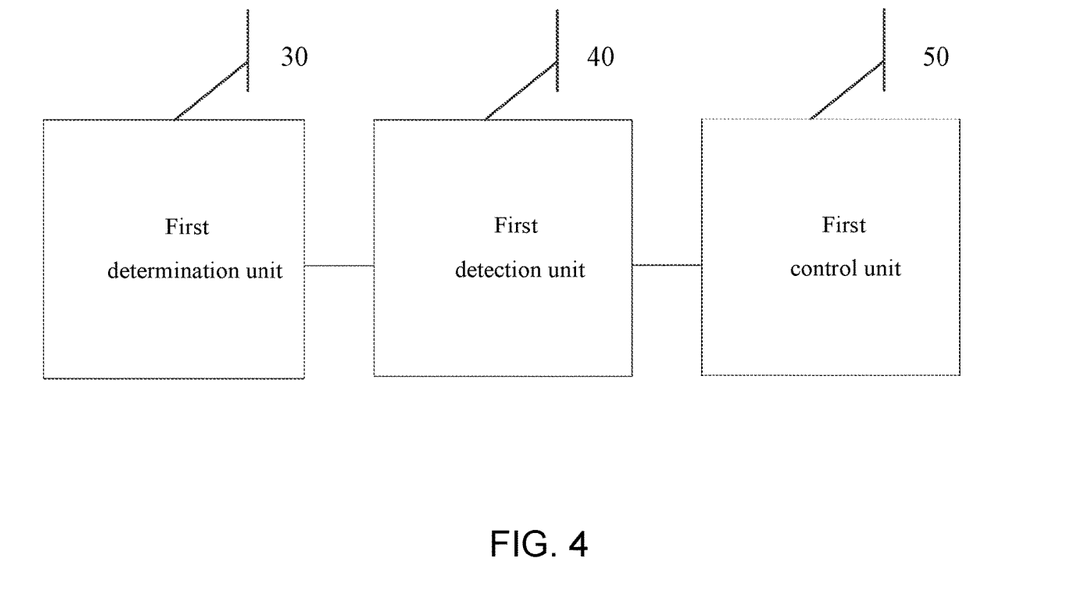
FIG. 4 is a structural block diagram of one embodiment of an electronic device of the present application.

FIG. 4, depicts an electronic device comprising a first determination unit 30, configured for determining a current working state of the electronic device as a first working state, and a current configuration of the electronic device as a first configuration corresponding to the first working state; a first detection unit 40, configured for detecting information; and a first control unit 50, configured for controlling the electronic device to be adjusted from the first working state to a second working state different from the first working state when the information satisfies a preset condition, and the electronic device is deformed from the first configuration to a second configuration corresponding to the second working state, wherein the second configuration is different from the first configuration.

In some embodiments, the first control unit 50 may be used for controlling the electronic device to be adjusted from the first configuration to the second configuration corresponding to the second working state; or for recognizing an external force applied to the electronic device, and the electronic device is deformed from the first configuration to the second configuration corresponding to the second working state under the effect of the external force.

In some embodiments, the electronic device further comprises: a first detection unit, configured for monitoring physiological parameters of a user currently using the electronic device; a second control unit, configured for indicating that the preset condition is satisfied if the physiological parameters show that the electronic device is not in contact with at least one body part of the current user and the electronic device is deformed from the first configuration to the second configuration; and a third control unit, configured for controlling the electronic device to maintain itself in the first configuration if the physiological parameters show that the electronic device is in contact with the at least one body part.

In some embodiments, the electronic device further comprises a fourth control unit, configured for keeping the current working state of the electronic device as the first working state and maintaining the current configuration of the electronic device as the first configuration after verifying that the information does not satisfy the preset condition.

Furthermore, in some embodiments, the electronic device, when in the first working state, can respond to instructions in a first part of an instruction set, and when in the second working state, can respond to instructions in a second part of the instruction set, and the number of instructions in the first part is different from the number of instructions in the second part.

In other embodiments of the electronic device, the number of instructions in the first part corresponding to the first working state is less than the number of instructions in the second part corresponding to the second working state, and the first control unit 50 is used for deforming the electronic device from a folded state to an unfolded state.

Alternatively, the number of instructions in the second part corresponding to the second working state may be less than the number of instructions in the first part corresponding to the first working state, and the first control unit 50 is used for deforming the electronic device from an unfolded state to a folded state.

By means of one or more technical solutions in the embodiments, the following one or more technical effects can be achieved.

The desired technical effects may be achieved by determining a current working state of the electronic device as a first working state, and a current configuration of the electronic device as a first configuration corresponding to the first working state; detecting information; controlling the electronic device to be adjusted from the first working state to a second working state different from the first working state when the information satisfies a preset condition; and deforming the electronic device from the first configuration to a second configuration corresponding to the second working state, wherein the second configuration is different from the first configuration.

In other words, based on the current working state of the deformable electronic device, the current configuration of the deformable electronic device can be adjusted to a configuration corresponding to the current working state, so as to solve the technical problem that exists in a deformable electronic device in that the options for change in the device's configuration are limited.

In some embodiments, the electronic device being deformed from the first configuration to the second configuration corresponding to the second working state may perform various functions, such as controlling the electronic device to be adjusted from the first configuration to the second configuration corresponding to the second working state; or recognizing an external force applied to the electronic device, and the electronic device is deformed from the first configuration to the second configuration corresponding to the second working state under the effect of the external force.

In some embodiments, the electronic device is capable of actively adjusting its current configuration on the basis of the current working state. In other embodiments, the electronic device, when under the effect of an external force, adjusts the current configuration of the electronic device, thereby improving performance of the electronic device and providing a more enjoyable experience for the user.

In some embodiments, the physiological parameters of the user currently using the electronic device are monitored. A preset condition may be satisfied if the physiological parameters show that the electronic device is not in contact with at least one body part of the current user, and the electronic device is deformed from the first configuration to the second configuration. Contrarily, the electronic device is able to maintain itself in the first configuration if the physiological parameters show that the electronic device is in contact with the at least one body part. In other words, the current configuration of the electronic device can be adjusted directly on the basis of the physiological parameter information of the current user, ensuring the device safety while also improving the user experience.

Those skilled in the art will understand that the embodiments may be provided as a method, a system or a computer program product. Therefore, the embodiments may be in the form of a hardware-only embodiment, a software-only embodiment, or an embodiment of a combination of hardware and software. Moreover, the embodiments may be in the form of a computer program product which is implemented on one or more computer available storage media (including, but not limited to, disk storage, CD-ROM, optical storage, and the like) which comprises computer available program codes.

The embodiments are described with reference to the methods, devices (systems) and flow diagrams and/or block diagrams of computer program products. It should be understood that computer program instructions may be used to implement each process and/or block in the flow diagrams and/or block diagrams, and combinations of processes and/or blocks in the flow diagrams and/or block diagrams. The computer program instructions may be provided to a universal computer, a dedicated computer, an embedded processor or the processor of another programmable data processing device to generate a machine, such that the computer or the processor of another programmable data processing device executes instructions to generate a unit to implement functions designated in one or more processes in a flow diagram and/or one or more blocks in a block diagram.

The computer program instructions may also be stored in a computer readable storage that can cause a computer or another programmable data processing device to work in a specific manner, such that the instructions stored in the computer readable storage generates a product comprising an instruction unit, and the instruction unit implements functions designated by one or more processes in a flow diagram and/or one or more blocks in a block diagram.

The computer program instructions may also be installed in a computer or another programmable data processing device, such that a series of operation steps are executed on the computer or another programmable device to generate computer implemented processing, and therefore, the instructions executed in the computer or another programmable device provide steps for implementing functions designated in one or more processes in a flow diagram and/or one or more blocks in a block diagram.

Specifically, the computer program instructions corresponding to the information processing method in the embodiment of the present application can be stored in a storage medium such as an optical disc, a hard disk, a USB flash disk, or other storage medium. When the computer program instructions corresponding to the information processing method in the storage medium are read or executed by an electronic device, the following steps may be included:

determining a current working state of the electronic device as a first working state, and a current configuration of the electronic device as a first configuration corresponding to the first working state;

detecting information; and controlling the electronic device to be adjusted from the first working state to a second working state different from the first working state when the information satisfies a preset condition and the electronic device is deformed from the first configuration to a second configuration corresponding to the second working state, wherein the second configuration is different from the first configuration.

As a result, when the computer instructions stored in the storage medium and corresponding to the step in which the electronic device is deformed from the first configuration to the second configuration are executed, the following steps may be included:

controlling the electronic device to be adjusted from the first configuration to the second configuration corresponding to the second working state; or recognizing an external force applied to the electronic device, and deforming the electronic device from the first configuration to the second configuration under the effect of the external force.

Optionally, when the computer instructions stored in the storage media and corresponding to the step are executed, the method may further comprises:

monitoring physiological parameters of a user currently using the electronic device;

indicating that the preset condition is satisfied if the physiological parameters show that the electronic device is not in contact with at least one body part of the current user and the electronic device is deformed from the first configuration to the second configuration; and maintaining the electronic device in the first configuration if the physiological parameters show that the electronic device is in contact with at least one body part.

Optionally, when the computer instructions stored in the storage media and corresponding to the information detection step are executed, the method may further comprise keeping the current working state of the electronic device as the first working state and maintaining the current configuration of the electronic device as the first configuration after verifying that the information does not satisfy the preset condition.

Optionally, in response to execution of the computer instructions stored in the storage media, the electronic device, when in the first working state, may respond to instructions in a first part of an instruction set. Alternatively, when the electronic device is in the second working state, it may respond to instructions in a second part of the instruction set. In either case, the number of instructions in the first part is different from the number of instructions in the second part.

Optionally, when the computer instructions stored in the storage media that correspond to the step in which the number of instructions in the first part corresponding to the first working state is less than the number of instructions in the second part corresponding to the second working state, and the electronic device is adjusted from the first configuration to the second configuration, the electronic device may be deformed from a folded state to an unfolded state.

Optionally, when the computer instructions stored in the storage media that correspond to the step in which the number of instructions in the second part corresponding to the second working state is less than the number of instructions in the first part corresponding to the first working state, and the electronic device is adjusted from the first configuration to the second configuration, the electronic device may be deformed from an unfolded state to a folded state.

While preferred embodiments have been described, variations and modifications may be made to these embodiments once the basic inventive concept is obtained by those skilled in the art. Thus, the appended claims are intended to be explained as including the preferred embodiments and all variations and modifications that fall within the scope of the present disclosure.

It is clear that various variations and modifications to the embodiments may be made by those skilled in the art without departing from the spirit and scope of the present disclosure. Accordingly, if these variations and modifications to the embodiments fall within the scope of the claims and the equivalents thereof, it is also intended that the present disclosure encompass these variations and modifications.

What is claimed is:

1. A method, comprising:
   determining a current working state of a deformable electronic device comprises a first working state;
   determining a current configuration of the deformable electronic device comprises a first configuration corresponding to the first working state;
   receiving an input;
   adjusting the deformable electronic device from operating in the first working state to operating in a second working state in response to determining that the input satisfies a preset condition;
   configuring the deformable electronic device to provide a set of predetermined functions of the deformable electronic device to the user in response to the deformable electronic device operating in the second working state; and
   automatedly reconfiguring the deformable electronic device from the first configuration to a second configuration corresponding to the second working state in response to determining that the deformable electronic device is operating in the second working state,
   wherein one of the first working state and the second working state comprises a screen lock state of a display screen of the deformable electronic device.

2. The method of claim 1, wherein automatedly configuring the deformable electronic device comprises:
   automatedly configuring the deformable electronic device from the first configuration to the second configuration corresponding to the second working state in response to determining that the input satisfies the preset condition.

3. The method of claim 1, wherein automatedly configuring the deformable electronic device comprises:
   automatedly configuring the deformable electronic device from the first configuration to the second configuration corresponding to the second working state in response to receiving an external force applied to the deformable electronic device that satisfies the preset condition of the input.

4. The method of claim 2, wherein:
   the input comprises one or more physiological parameters of a user; and
   the input satisfies the preset condition in response to the one or more physiological parameters indicating that the deformable electronic device is not in contact with at least one body part of the user.

5. The method of claim 1, wherein:
   the input comprises one or more physiological parameters of a user; and
   the input does not satisfy the preset condition in response to the one or more physiological parameters indicating that the deformable electronic device is in contact with at least one body part of the user.

6. The method of claim 1, further comprising,
   maintaining the deformable electronic device in the first working state in response to determining that the input does not satisfy the preset condition; and
   maintaining the deformable electronic device in the first configuration in response to determining that the input does not satisfy the preset condition.

7. The method of claim 1, wherein:
   the deformable electronic device comprises a computer-readable storage medium configured to store an instruction set;
   the deformable electronic device is configured to respond to instructions in a first portion of the instruction set while the deformable electronic device is operating in the first working state; and
   the deformable electronic device is further configured to respond to instructions in a second portion of the instruction set while the deformable electronic device is operating in the second working state.

8. The method of claim 7, wherein:
   the first configuration comprises a folded configuration; and
   the second configuration comprises an unfolded configuration.

9. The method of claim 7, wherein:
   the first configuration comprises an unfolded configuration; and
   the second configuration comprises a folded configuration.

10. An apparatus, comprising:
    a deformable housing;
    a display screen;
    an input device configured to receive inputs; and
    a processor coupled to the housing,
    wherein the processor is configured to:
      determine a current working state of the apparatus comprises a first working state,
      determine a current configuration of the apparatus comprises a first configuration corresponding to the first working state, receive, via the input device, an input,
adjust the apparatus from operating in the first working state to operating in a second working state in response to determining that the input satisfies a preset condition,
configure the apparatus to provide a set of predetermined functions of the deformable electronic device to the user in response to the apparatus operating in the second working state, and
automatedly reconfigure the apparatus from the first configuration to a second configuration corresponding to the second working state in response to determining that the deformable electronic device is operating in the second working state,
wherein one of the first working state and the second working state comprises a screen lock state of the display screen.

11. The apparatus of claim 10, wherein, in automatedly reconfiguring the apparatus, the processor is further configured to:
automatedly configure the apparatus from the first configuration to the second configuration corresponding to the second working state in response to determining that the input satisfies the preset condition.

12. The apparatus of claim 10, wherein, in automatedly reconfiguring the apparatus, the processor is further configured to:
automatedly configure the apparatus from the first configuration to the second configuration corresponding to the second working state in response to receiving an external force applied to the apparatus that satisfies the preset condition of the input.

13. The apparatus of claim 10, wherein:
the input comprises one or more physiological parameters of a user; and
the processor is further configured to:
determine that the input satisfies the preset condition in response to the one or more physiological parameters indicating that the apparatus is not in contact with at least one body part of the user.

14. The apparatus of claim 10, wherein:
the input comprises one or more physiological parameters of a user; and
the processor is further configured to:
determine that the input does not satisfy the preset condition in response to the one or more physiological parameters indicating that the apparatus is in contact with at least one body part of the user, and
maintain the apparatus in the first configuration in response to determining that the preset condition is not satisfied.

15. The apparatus of claim 10, wherein the processor is further configured to:
maintain the apparatus in the first working state in response to determining that the input does not satisfy the preset condition; and
maintain the apparatus in the first configuration in response to determining that the input does not satisfy the preset condition.

16. The apparatus of claim 10, further comprising:
computer-readable storage medium that stores an instruction set,
wherein the processor is further configured to:
respond to instructions in a first portion of the instruction set while the apparatus is operating in the first working state, and
respond to instructions in a second portion of the instruction set while the apparatus is operating in the second working state.

17. The apparatus of claim 16, wherein:
the processor is further configured to configure the apparatus from the first configuration to the second configuration corresponding to the second working state;
the first configuration comprises a folded configuration; and
the second configuration comprises an unfolded configuration.

18. The apparatus of claim 16, wherein:
the processor is further configured to configure the apparatus from the first configuration to the second configuration corresponding to the second working state;
the first configuration comprises an unfolded configuration; and
the second configuration comprises a folded configuration.

19. An apparatus, comprising:
a deformable housing; and
a processor coupled to the deformable housing,
wherein the processor is configured to:
operate in a first operating state,
configure the deformable housing to include a first configuration in response to the processor operating in the first operating state,
receive an input,
operate in a second operating state in response to receiving the input, and
automatedly reconfigure the deformable housing from the first configuration to a second configuration in response to determining that the processor is operating in the second operating state.

20. The apparatus of claim 19, wherein:
the processor is configured to switch to operating in the second operating state in response to the input satisfying a preset condition, and
the input is one of a user input and an external force applied to the apparatus.

* * * * *